(12) United States Patent
Gorman et al.

(10) Patent No.: US 7,795,752 B2
(45) Date of Patent: Sep. 14, 2010

(54) SYSTEM AND METHOD FOR INTEGRATED POWER CONTROL

(75) Inventors: Corey L. Gorman, Peoria, IL (US); Randall T. Anderson, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 334 days.

(21) Appl. No.: 11/998,427

(22) Filed: Nov. 30, 2007

(65) Prior Publication Data

US 2009/0140574 A1 Jun. 4, 2009

(51) Int. Cl.
*B60L 1/00* (2006.01)
(52) U.S. Cl. ...................................... 307/9.1
(58) Field of Classification Search ................... 307/9.1
See application file for complete search history.

(56) References Cited

U.S. PATENT DOCUMENTS

| | | |
|---|---|---|
| 3,795,107 A | 3/1974 | Ward |
| 3,803,841 A | 4/1974 | Erickson et al. |
| 3,914,938 A | 10/1975 | Cornell et al. |
| 3,946,560 A | 3/1976 | Mac Intosh et al. |
| 4,019,596 A | 4/1977 | Crull |
| 4,085,812 A | 4/1978 | Robinson et al. |
| 4,086,767 A | 5/1978 | Byers, Jr. |
| 4,126,994 A | 11/1978 | Rockwell |
| 4,165,613 A | 8/1979 | Bernhoft et al. |
| 4,399,886 A | 8/1983 | Pollman |
| 4,400,935 A | 8/1983 | Louis |
| 4,465,942 A | 8/1984 | Deicke |
| 4,606,005 A | 8/1986 | Ribbens |
| 4,689,955 A | 9/1987 | Lietzke |
| 4,739,616 A | 4/1988 | Myers |
| 4,934,985 A | 6/1990 | Strubbe |
| 5,203,168 A | 4/1993 | Oshina et al. |
| 5,270,578 A | 12/1993 | Yamamura |
| 5,416,702 A | 5/1995 | Kitagawa et al. |
| 5,447,029 A | 9/1995 | Swick et al. |
| 5,496,227 A | 3/1996 | Minowa et al. |
| 5,577,474 A | 11/1996 | Livshiz et al. |
| 5,845,221 A | 12/1998 | Hosokawa et al. |

(Continued)

FOREIGN PATENT DOCUMENTS

JP    2005/186788    7/2005

(Continued)

OTHER PUBLICATIONS

Chiu et al., "Knowledge-Based Qualitative Modelling and Adaptive Distribution of Power", Proceedings of the 25th Intersociety Energy Conversion Engineering Conference, Aug. 12, 1990, pp. 353-357, vol. 1, XP000214665, New York, US.

*Primary Examiner*—Robert L. Deberadinis
(74) *Attorney, Agent, or Firm*—Finnegan, Henderson, Farabow, Garrett & Dunner LLC

(57) ABSTRACT

A method for distributing power generated by a power generation system may include determining available power that can be generated by the power generation system. The method may also include obtaining power requests from power transforming devices, comparing the available power to the power requests, and determining amounts of the available power to distribute to the power transforming devices. The method may further include obtaining operating condition requests from the power transforming devices, and determining the operating conditions under which the power generation system should operate.

15 Claims, 6 Drawing Sheets

U.S. PATENT DOCUMENTS

| | | |
|---|---|---|
| 6,217,479 B1 | 4/2001 | Brown et al. |
| 6,377,884 B1 | 4/2002 | Loeffler et al. |
| 6,427,107 B1 * | 7/2002 | Chiu et al. .................. 701/50 |
| 6,472,772 B2 | 10/2002 | Onizuka et al. |
| 6,536,402 B2 | 3/2003 | Houchin et al. |
| 6,581,565 B2 | 6/2003 | Heslop et al. |
| 6,675,577 B2 | 1/2004 | Evans |
| 6,700,386 B2 | 3/2004 | Egami |
| 6,704,638 B2 | 3/2004 | Livshiz et al. |
| 6,795,755 B2 * | 9/2004 | Keilhofer et al. ............. 701/22 |
| 6,807,474 B2 | 10/2004 | Bergqvist et al. |
| 6,819,997 B2 | 11/2004 | Buchanan et al. |
| 6,842,686 B2 | 1/2005 | Homeyer et al. |
| 6,859,711 B2 | 2/2005 | Eckert et al. |
| 6,986,398 B2 | 1/2006 | Obayashi |
| 7,098,555 B2 | 8/2006 | Glahn et al. |
| 7,137,347 B2 | 11/2006 | Wong et al. |
| 7,146,263 B2 | 12/2006 | Guven et al. |
| 7,240,487 B2 | 7/2007 | Diaz et al. |
| 7,260,931 B2 | 8/2007 | Egelja et al. |
| 7,310,943 B2 | 12/2007 | Burgart et al. |
| 2004/0124703 A1 | 7/2004 | Tani et al. |
| 2004/0267436 A1 | 12/2004 | Prodi et al. |
| 2005/0057208 A1 | 3/2005 | Seibel et al. |
| 2005/0171669 A1 | 8/2005 | Sato |
| 2007/0005205 A1 | 1/2007 | Bernardi et al. |
| 2007/0141999 A1 | 6/2007 | Przywecki |

FOREIGN PATENT DOCUMENTS

WO    02087053    10/2002

* cited by examiner

SYSTEM AND METHOD FOR INTEGRATED POWER CONTROL

TECHNICAL FIELD

The present disclosure relates to a system and method for integrated power control, and, more particularly, to a system and method for integrated power control for a machine.

BACKGROUND

A machine, such as, for example, an engine, a generator, or a vehicle, may include one or more sources of power. Power sources may include engines, batteries, and any other suitable energy generating or energy storage devices. The machine may also include powered devices that may run using power generated or otherwise supplied by the power source. During operation of the machine, multiple powered devices may request power from the power sources. At times, power requests may conflict because the power sources may not be capable of fulfilling each and every power request.

If power requested by the powered devices exceeds the available power from the power source, some or all of the powered devices may not receive sufficient power, and/or the power source may fail or stall. Power source failures may result in machine downtime and decreased efficiency. Intelligently distributing power to different parts of the machine may help to reduce power source failures. Intelligently distributing power from the power sources to the powered devices may involve deciding which powered devices will receive power and how much power they will receive.

One attempt to control the distribution of power in a machine is described in U.S. Pat. No. 6,986,398 to Obayashi ("Obayashi"). Obayashi discloses a power feed portion including a power storage portion and a power generation portion. The power feed portion feeds electric power to a plurality of on-vehicle loads. In cases where the sum of feedable electric power is smaller than the sum of required electric power or in cases where an electric quantity related to the sum of feedable electric power is smaller than an electric quantity related to the sum of required electric power, a control portion increases the sum of feedable electric power or decreases the sum of required electric power. However, in some instances, the power feed portion may produce undesirable results when it decreases the sum of required electric power. Further, the power feed portion may not provide a framework for distributing power to the plurality of on-vehicle loads while also adjusting the operating state of the power generation portion so that the power generated is generated in a desirable manner. These drawbacks may lead to inefficiencies and lackluster machine performance.

The disclosed system and method is directed at overcoming one or more of the problems set forth above.

SUMMARY

According to one aspect of this disclosure, a machine may be provided. The machine may include a power generation system operatively coupled to a power generation module. The machine may also include power transforming devices configured to receive power from the power generation system. The power transforming devices may be operatively coupled to power request modules and output command modules. The machine may further include a control system operatively coupled to the power generation module, the power request modules, and the output command modules. The control system may include at least one available power module configured to determine how much power can be generated by the power generation system. The control system may also include a power distribution module configured to obtain inputs from the available power modules and the power request modules, to determine amounts of power that can be distributed to the power transforming devices. The control system may further include a power generation control module configured to obtain inputs from the power distribution modules and the output command modules, to determine the operating condition under which the power generation system should operate.

According to another aspect of this disclosure, a method for distributing power generated by a power generation system may be provided. The method may include determining available power that can be generated by the power generation system. The method may also include obtaining power requests from power transforming devices, comparing the available power to the power requests, and determining amounts of the available power to distribute to the power transforming devices. The method may further include obtaining operating condition requests from the power transforming devices, and determining the operating conditions under which the power generation system should operate.

According to yet another aspect of this disclosure, a control system may be provided. The control system may include a platform, a display device, and a processor in communication with the platform and the display device. The processor may be configured to determine available power that can be generated by a power generation system. The processor may also be configured to obtain power requests. The processor may further be configured to determine amounts of available power that can be used to fulfill the power requests based on magnitudes of the power requests. The processor may further be configured to obtain operating condition requests requesting for the power generation system to operate under one or more operating conditions. The processor may further be configured to select at least one of the operating condition requests for use as a basis for controlling the operation of the power generation system.

DETAILED DESCRIPTION

Figure 1:
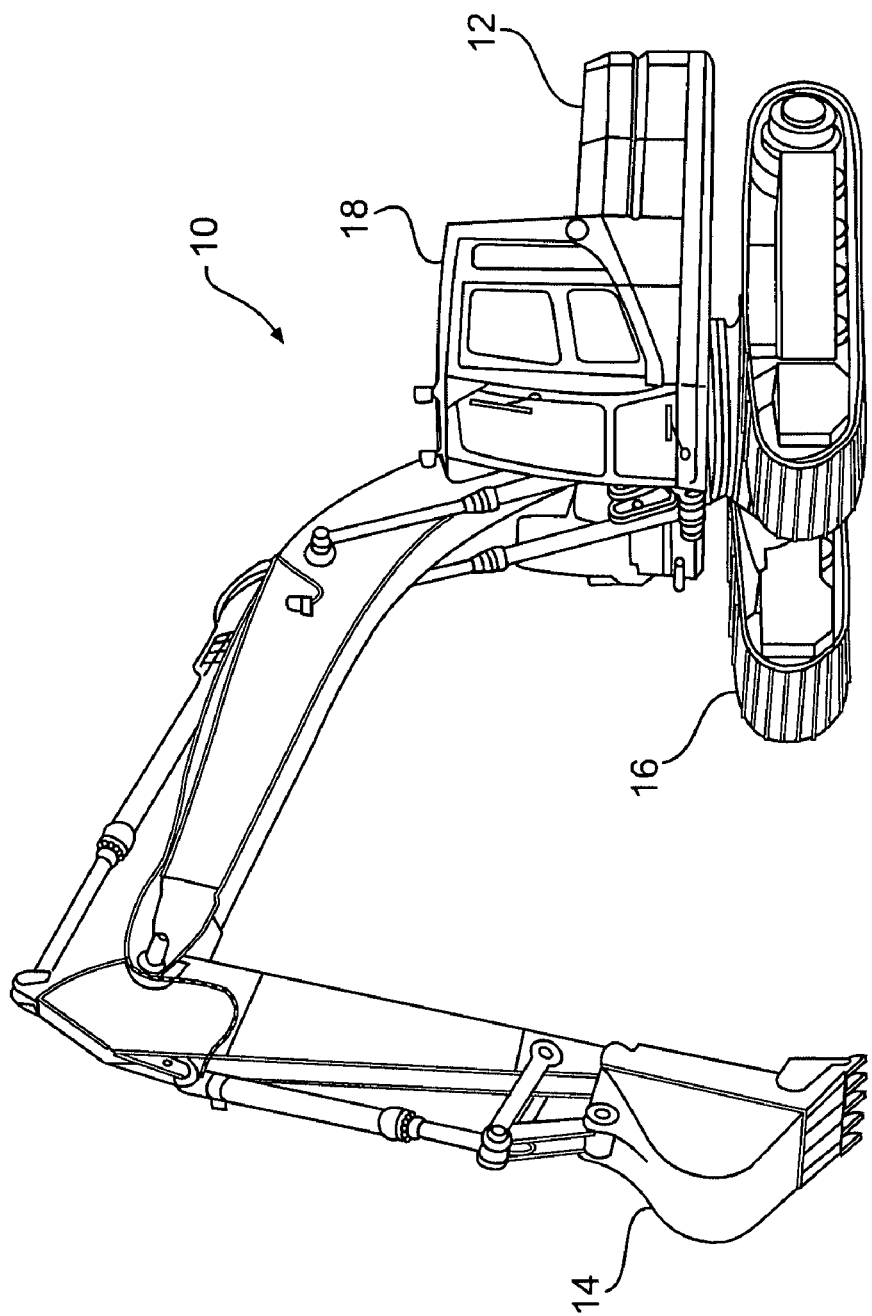
FIG. 1 is an illustration of an exemplary machine.
Figure 2:
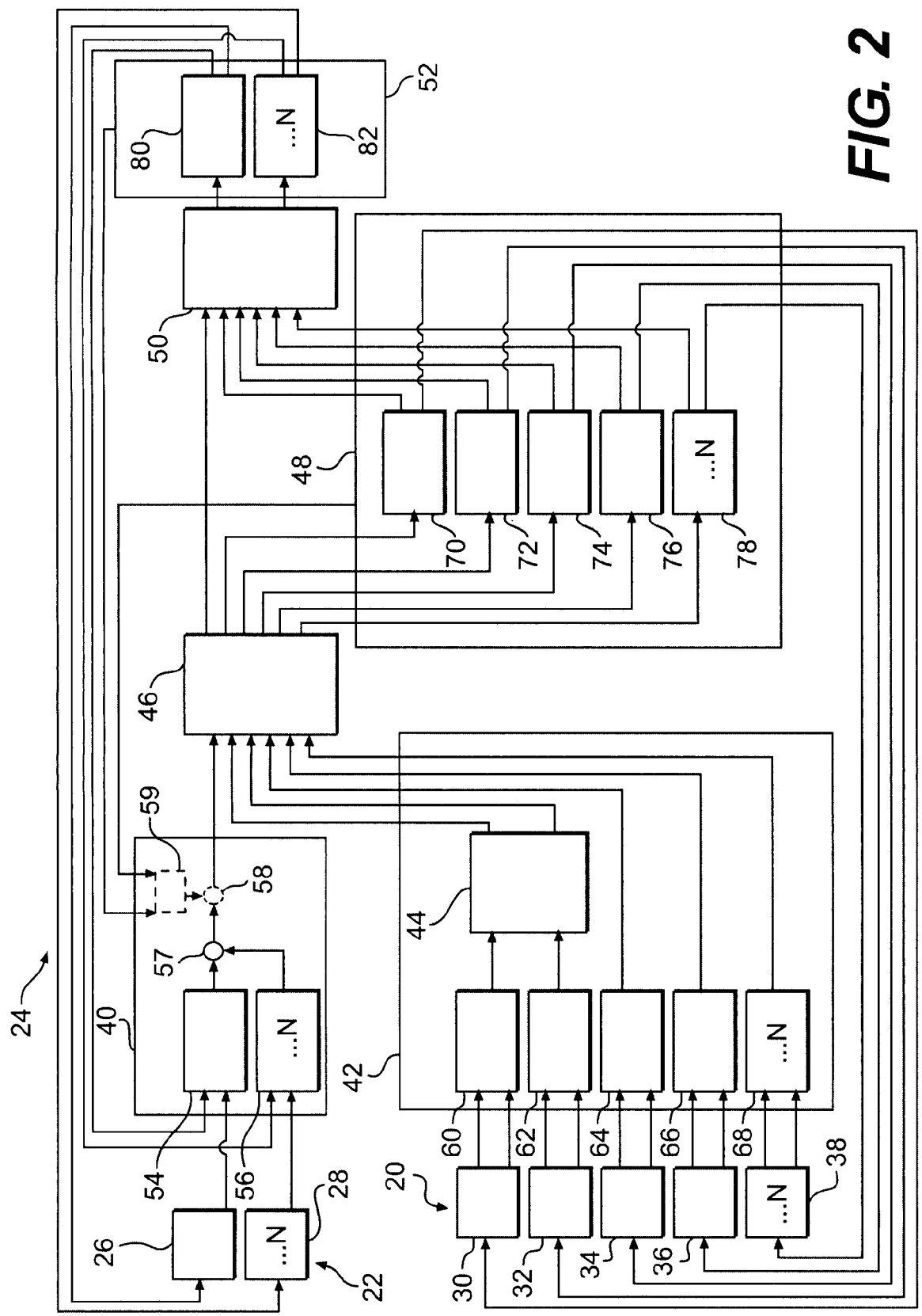
FIG. 2 is a schematic illustration of an exemplary control system for use with the exemplary disclosed machine of FIG. 1.

An exemplary machine 10, shown in FIG. 1, may be used to perform operations at a job site. Machine 10 may include, for example, a main body 12, an implement 14, a ground engaging device 16, and a cab 18. As shown in the schematic diagram of FIG. 2, machine 10 may also include power transforming devices 20 associated with main body 12, implement 14, ground engaging device 16, and/or cab 18, that may be configured to provide machine 10 with the ability to perform operations. Machine 10 may further include a power generation system 22 configured to generate power for powering power transforming devices 20. It is contemplated that the word "power" may broadly encompass electrical energy, hydraulic energy in the form of pressurized fluid flow, torque, and/or engine speed. Machine 10 may also include a control system 24 configured to regulate the operation of power generation system 22, and to intelligently distribute power generated by power generation system 22 to power transforming devices 20.

Power generation system 22 may include an engine 26 and an auxiliary power source 28. Power generation system 22 may be configured to generate power and/or convert one type of energy to another, to help fulfill the power requirements of power transforming devices 20. For example, engine 26 and/or auxiliary power source 28 may generate mechanical, hydraulic, and/or electrical power for use with power transforming devices 20.

Engine 26 may include an internal combustion engine configured to combust fuel, such as gasoline, diesel fuel, or gaseous fuel. The structure of internal combustion engines and the details of their operation are commonly known in the art. Internal combustion engines may combust fuel in one or more combustion chambers to drive linear movement of one or more pistons. The one or more pistons may be coupled by a connecting rod to a crankshaft to transmit the linear piston motion to the crankshaft, thereby converting linear motion to rotary motion, that is, rotation of the crankshaft. The power or torque associated with a rotating crankshaft (not shown) of engine 26 may be distributed to power transforming devices 20. The maximum amount of power that engine 26 can generate may depend on its engine speed. Engine 26 may have the potential to generate greater amounts of power when running at greater speeds. If power transforming devices 20 try to draw more power than engine 26 can generate at a particular engine speed, engine 26 may stall, causing an interruption in machine operation. Reducing the number of engine stalls through the intelligent distribution of available power may improve machine efficiency.

Auxiliary power source 28 may include a secondary engine, an electric battery, a hydraulic accumulator, and/or any other suitable power source. Auxiliary power source 28 may be configured to generate, store, or accumulate power, and may distribute that power to power transforming devices 20. The power from auxiliary power source 28 may be supplementary to the power from engine 26. The notation " . . . N" associated with auxiliary power source 28 indicates that power generation system 22 may include additional, fewer, or different power sources than those described above. The type and/or number of power sources may depend on machine type. The power sources listed above are exemplary.

Power transforming devices 20 may include any devices on machine 10 configured to transform an input, such as power or torque from engine 26 and/or auxiliary power source 28, into an output, such as movement of ground engaging device 16, implement 14, and/or any other change in the state of machine 10. Ground engaging device 16 may include a wheel assembly and/or track type device, and implement 14 may include a blade, scraper, bucket, or gripping device. Power transforming devices 20 of machine 10 may include, for example, a drive pump 30, an idle pump 32, a cooling system 34, an auxiliary pump 36, and an air-conditioning system 38. It should be understood that the notation " . . . N" associated with air-conditioning system 38 indicates that power transforming devices 20 may include additional, fewer, and/or different components than those listed above, as the components listed above are exemplary. Further, power transforming devices 20 may be components of a drive system, hydraulic actuation system, fan assembly, transmission, and/or any other suitable system found in machines.

Drive pump 30 may be operatively coupled to engine 26 and/or auxiliary power source 28. Drive pump 30 may be part of a hydraulic system (not shown) of machine 10, and may be configured to pump pressurized hydraulic fluid through the hydraulic system to drive one or more machine components, such as, for example, implement 14 and ground engaging device 16. The power that allows drive pump 30 to perform its functions may come from engine 26 and/or auxiliary power source 28.

Idle pump 32 may also be operatively coupled to engine 26 and/or auxiliary power source 28. Idle pump 32 may be part of a hydraulic system of machine 10, and may be configured to pump pressurized hydraulic fluid through the hydraulic system. Idle pump 32 may supplement drive pump 30. For example, if implement 14 is idle and does not require pressurized hydraulic fluid from drive pump 30, drive pump 30 may de-energize, while idle pump 32 may continue to run, and thus, may provide an immediate source of pressurized hydraulic fluid to implement 14 when movement of implement 14 is requested by an operator. Idle pump 32 may draw power from engine 26 and/or auxiliary power source 28.

Cooling system 34 may also be operatively coupled to engine 26 and/or auxiliary power source 28, and may be configured to help prevent engine 26 from overheating. Cooling system 34 may include one or more pumps and conduits for circulating a coolant in and/or around engine 26. Cooling system 34 may also include one or more fans or similar powered devices for creating air flow. The coolant may absorb heat from engine 26, which may be carried away by the air flow as the coolant passes through a heat exchanger. The one or more pumps and fans in cooling system 34 may draw power from engine 26 and/or auxiliary power source 28 during operation.

Auxiliary pump 36 may also be operatively coupled to engine 26 and/or auxiliary power source. Auxiliary pump 36 may be part of an auxiliary fluid transport/storage system of machine 10, and may be configured to pump fluid, including, for example, coolant, lubricating fluid, or hydraulic fluid through the auxiliary system. Auxiliary pump 36 may draw power from engine 26 and/or auxiliary power source 28 in order to operate.

Air-conditioning system 38 may be operatively coupled to engine 26 and/or auxiliary power source 28, and may be configured to extract heat from cab 18. Air-conditioning system 38 may include a pump (not shown) for pumping refrigerant, a compressor (not shown) for pressurizing the refrigerant, a condenser (not shown) and other components commonly known in the art for running a refrigeration cycle. The pump, compressor, and/or condenser of air-conditioning system 38 may draw power from engine 26 and/or auxiliary power source 28.

Control system 24 may include any suitable type of processor-based system on which processes and methods consistent with the disclosed embodiments may be implemented. Control system 24 may include a platform that includes one or more hardware and/or software components configured to execute software programs. Exemplary hardware components may include a central processing unit, a random access memory, a read-only memory, a storage, a database, an input/output device, and an interface. Exemplary software components may include a computer-readable medium with computer-executable instructions for performing methods consistent with certain disclosed embodiments. One or more of the hardware components listed above may implement the software, and in doing so, may perform one or more operations. It should be understood that control system 24 may include additional, fewer, or different components than those listed above, as the components listed above are exemplary.

Control system 24 may include available power modules 40, power request modules 42, a main pump power request processing module 44, a power distribution module 46, output command modules 48, a power generation control module 50, and power generation modules 52.

Available power modules 40 may include an engine available power module 54 and an auxiliary available power module 56. Engine available power module 54 may obtain engine related inputs, including, for example, signals indicative of engine operating conditions, torque, power, capacity, and/or speed. The signals may be obtained from one or more sensors (not shown) monitoring engine 26. Engine available power module 54 may use the engine related inputs to determine the total power that engine 26 may be capable of producing in an operating state. It should be understood that the total power that engine 26 may be capable of producing at any given time may depend on such factors as machine altitude, fuel quality, and/or engine speed. Engine available power module 54 may generate a signal indicative of the total available engine power. Auxiliary available power module 56 may obtain auxiliary power source related inputs, including, for example, signals indicative of auxiliary power source operating conditions, voltage, current, and/or hydraulic pressure. The signals may be obtained from one or more sensors (not shown) monitoring auxiliary power source 28. Auxiliary available power module 56 may use the auxiliary power source related inputs to determine the total power that auxiliary power source 28 can produce, and may generate a signal indicative of the total available auxiliary power. It should be understood that the notation " . . . N" associated with auxiliary available power module 56 indicates that auxiliary available power module 56 may include additional, fewer, or different available power modules than those shown and described above.

The total engine power and the total auxiliary power may be relayed to summation junction 57. Summation junction 57, upon receiving the total engine power and the total auxiliary power, may sum them to arrive at a total combined power for power generation system 22. Summation junction 57 may relay a signal indicative of the total combined power to power distribution module 46.

Power request modules 42 may be coupled to power transforming devices 20. Power request modules 42 may obtain inputs related to power transforming devices 20, including, for example, pressures, flow rates, current power usage, and/or expected power usage. The inputs may be in the form of signals generated by one or more sensors (not shown) monitoring power transforming devices 20, machine 10, and/or an external object, such as a hole or pile. Signals may also be generated by a machine operator. For example, signals may be generated as an operator operates a control device (not shown), such as a joystick, steering wheel, or accelerator pedal in cab 18, to move ground engaging device 16, implement 14, and/or machine 10. Based on the inputs, power request modules 42 may generate requests for power from engine 26 and/or auxiliary power source 28. Additionally or alternatively, based on the inputs, power request modules 42 may generate requests for engine speed or fluid flow from engine 26 and/or auxiliary power source 28.

It is also contemplated that power request modules 42 may include, or may form a part of, one or more advanced control systems. A traction control system and a ride control system (both not shown) are just two examples of advanced control systems that may be used in machines. During operation of a machine having wheels for ground engaging devices, one or more of the wheels may lose traction and slip. A traction control system may monitor wheel speed and may selectively apply a brake (not shown) so that wheel speed matches a desired wheel speed, thus enhancing traction and helping to reduce slippage. The traction control system may modify signals from power request modules 42, or may generate its own signals, to request power, speed, or flow from engine 26 and/or auxiliary power source 28, for performing the above described operation. Similarly, a ride control system may also modify signals from power request modules 42, or may generate its own signals, to request power, speed, or flow from engine 26 and/or auxiliary power source 28. The ride control system may modify or generate the signals to provide for selective fluid coupling of hydraulic systems associated with implement 14 with an accumulator (not shown), thus creating a shock-absorber system to prevent implement 14 from bouncing erratically and rocking machine 10. It should be understood that power request modules 42 may include, or may form a part of, additional or alternative advanced control systems that would be apparent to those skilled in the art.

Along with the power requests, power request modules 42 may also generate priority signals. A priority signal may include a priority level indicative of the importance of a power request. The importance may be determined based on criteria. For example, if a particular power transforming device, such as a braking system or transmission, requests power for immediate use, the power request module associated with that power transforming device may assign a top level priority to the power request, to convey the importance of the power request. If the power transforming device needs power for the purpose of protecting machine 10 from being damaged, or from experiencing excessive wear and tear, the power request module associated with that power transforming device may assign an intermediate level priority to the power request signal, to convey that the power request is of intermediate importance, or lesser importance than a top level priority power request. If the power transforming device needs power for the purpose of improving or maintaining machine efficiency, the power transforming device's power request module may assign a bottom level priority to the power request signal, to convey that the power request is of relatively low importance, or lesser importance that an intermediate level priority power request. The higher the priority level, the higher the probability that the amount of power requested will be provided.

The priority signals from power request modules 42 may be assigned to power request modules 42 based on the functions of power transforming devices 20 associated with power request modules 42. For example, if a power request module is associated with a power transforming device that is part of a braking system of machine 10, that power request module may assign a top level priority to its power requests. If, on the other hand, a power request module is associated with a power transforming device that is part of a hydraulic actuator, that power request module may always assign an intermediate level priority to its power requests. Similarly, if a power request module is associated with a power transforming device that is part of a cab cooling system, that power request module may assign a bottom level priority to its power requests. Additionally or alternatively, power distribution module 46 may be programmed to associate a particular priority level with a particular power transforming device. It should be understood that a single power transforming device may have different priority levels in different machines and/or environments.

In the exemplary embodiment shown, power request modules 42 may include a drive pump power request module 60, an idle pump power request module 62, a cooling system power request module 64, an auxiliary pump power request module 66, and an air-conditioning system power request module 68. The "... N" notation associated with air-conditioning system power request module 68 indicates that additional, fewer, or different power request modules 42 may be included. In other words, the listing of power request modules 42 is exemplary, and it should be understood that the type and number of power request modules 42 may differ for different machines.

Drive pump power request module 60 may obtain inputs or signals related to drive pump 30, including, for example, pump displacement values, pressures, flow rates, feed rates, current power usage, and/or expected power usage. Drive pump power request module 60 may generate a drive pump power request signal based on those inputs. Drive pump power request module 60 may also generate a priority signal indicative of the importance of the drive pump power request.

Idle pump power request module 62 may communicate with idle pump 32. Idle pump power request module 62 may obtain inputs or signals related to idle pump 32, including, for example, pump displacement values, pressures, flow rates, feed rates, current power usage, and/or expected power usage. Idle pump power request module 62 may use the signals to generate an idle pump power request signal. Idle pump power request module 62 may be configured to request power from engine 26 and/or auxiliary power source 28 so that idle pump 32 may continually pump fluid. Along with the idle pump power request signal, idle pump power request module 62 may generate a priority signal indicative of the level of importance of the idle pump power request.

Drive pump 30 and idle pump 32 may operate on the same or related hydraulic systems in machine 10. Thus, drive pump 30 and idle pump 32 may cooperate to provide a requested amount of pressurized fluid for performing an operation. If the rate of flow of pressurized fluid supplied by drive pump 30 increases, then the rate of flow of pressurized fluid supplied by idle pump 32 may be decreased, so that the requested amount of pressurized fluid flow may be achieved without producing excess pressurized fluid flow. If the power supplied by drive pump 30 decreases, then the power supplied by idle pump 32 may increase so that the requested amount of pressurized fluid flow may be achieved. Thus, drive pump 30 and idle pump 32 may be operatively connected, such that one may compensate for the strength or weakness of the other. The cooperation between drive pump 30 and idle pump 32 may be implemented using main pump power request processing module 44.

Main pump power request processing module 44 may obtain power requests and priorities generated by drive pump power request module 60 and idle pump power request module 62. Main pump power request processing module 44 may compare the power requests and priorities, and may adjust one or both of them to achieve a proper balance between drive pump 30 operation and idle pump 32 operation. For example, main pump power request processing module 44 may also selectively adjust the drive pump power request and/or the idle pump power request, so that the combined power request from idle pump power request module 62 and drive pump power request module 60 may be sufficient. Additionally or alternatively, main pump power request processing module 44 may adjust the drive pump power request and/or the idle pump power request, so that the combined power request from drive pump power request module 60 and idle pump power request module 62 does not exceed a range of values that may be set by an operator using controls (not shown) in cab 18.

Cooling system power request module 64 may communicate with cooling system 34. Cooling system power request module 64 may obtain inputs related to cooling system 34, including, for example, temperature readings, pump displacement values, pressures, flow rates, feed rates, current power usage, and/or expected power usage. The inputs may be in the form of signals generated by one or more sensors (not shown) monitoring cooling system 34. It is also contemplated that the signals may be generated by one or more sensors (not shown) monitoring temperatures at one or more locations in or around machine 10, or of the external environment. It is further contemplated that the signals may be generated by an operator monitoring engine temperatures using a temperature gauge or similar device in cab 18. Cooling system power request module 64 may use the signals to determine the amount of power that cooling system 34 requires, and may generate a request for power from engine 26 and/or auxiliary power source 28. Along with the power request, cooling system power request module 64 may also assign a priority indicative of the level of importance of the power request.

Auxiliary pump power request module 66 may communicate with auxiliary pump 36. Auxiliary pump power request module 66 may obtain inputs related to auxiliary pump 36, including, for example, pump displacement pressures, flow rates, feed rates, current power usage, and/or expected power usage. The inputs may be in the form of signals generated by one or more sensors (not shown) monitoring auxiliary pump 36. Based on the signals, auxiliary pump power request module 66 may generate a request for power from engine 26 and/or auxiliary power source 28. Auxiliary pump power request module 66 may also assign a priority to the power request indicative of the importance of the power request.

Air-conditioning system power request module 68 may communicate with air-conditioning system 38. Air-conditioning system power request module 68 may obtain inputs related to air-conditioning system 38, including, for example, temperature readings, pump displacement, pressures, flow rates, feed rates, current power usage, and/or expected power usage. The inputs may come in the form of signals generated by one or more sensors (not shown) monitoring air-conditioning system 38. It is also contemplated that the signals may be generated by one or more sensors (not shown) monitoring the temperature in cab 18, or the temperature of the external environment. It is further contemplated that the signals may be generated by an operator adjusting the temperature in cab 18 using a knob, switch, or similar device. Air-conditioning system power request module 68 may use the signals to determine the amount of power that air-conditioning system 38 requires, and may generate a request for power from engine 26 and/or auxiliary power source 28. Air-conditioning system power request module 68 may also assign a priority indicative of the level of importance of the power request.

Figure 4A:
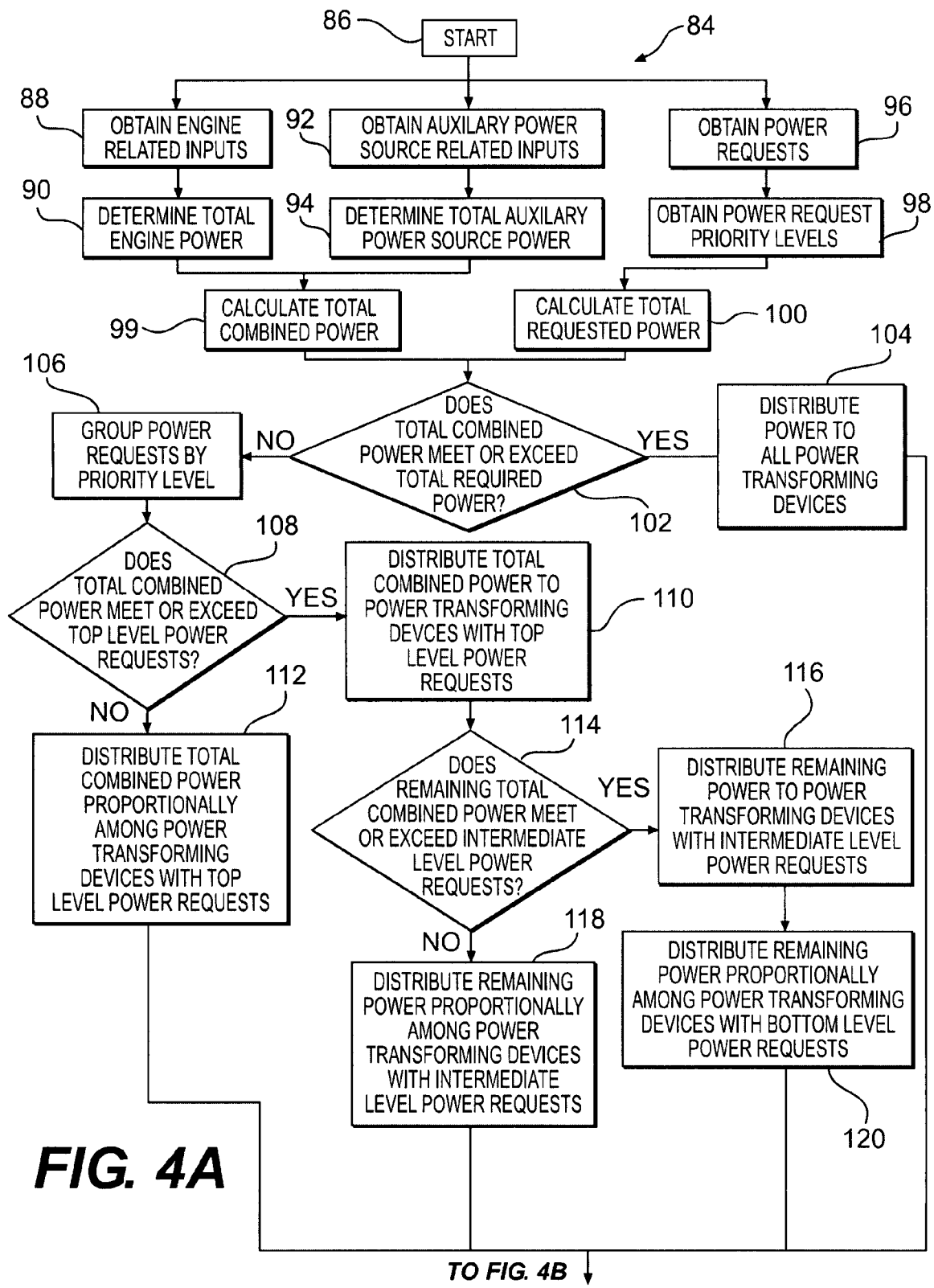
FIG. 4A is a flow diagram of a method according to another aspect of the present disclosure.
Figure 4B:
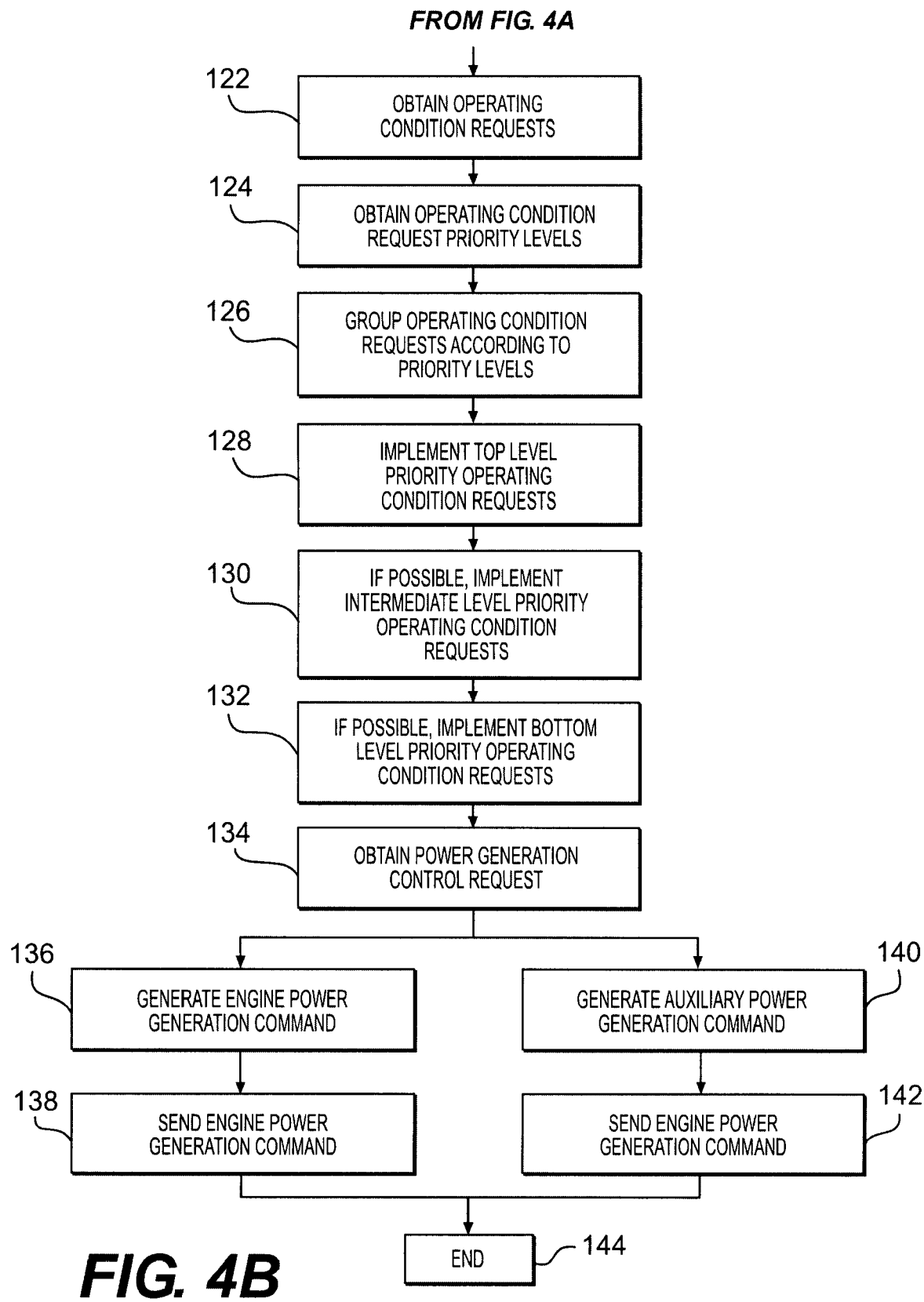
FIG. 4B is a flow diagram of a method according to yet another aspect of the present disclosure.

Power distribution module 46 may obtain the total combined power, the power requests, and/or their assigned priorities. Power distribution module 46 may sum the power requests to determine the total requested power. Power distribution module 46 may compare the total requested power to the total combined power. If the total combined power meets or exceeds the total requested power, all power transforming devices 20 may receive the power requested by their associated power request modules 42. If the total combined power is insufficient, power distribution module may intelligently distribute the total combined power based on the magnitudes of the power requests and/or their assigned priorities. In order to distribute the power, power distribution module 46 may generate one or more power distribution signals. A power distribution signal may be indicative of the amount of power that should be distributed to a power transforming device based on the determinations made by power distribution module 46. A description of methodology that may be used by power distribution module 46 is shown in FIGS. 4A and 4B. If power request modules 42 generate speed or flow requests in place of or in addition to power requests, power distribution module 46 may receive the speed or flow requests, and may intelligently distribute the total combined power based on the speed or flow requests and/or priority levels assigned to them. In other words, the methodology described in FIGS. 4A and 4B may be carried out using speed or flow requests in place of power requests.

Output command modules 48 may be provided for power transforming devices 20. Output command modules 48 may include a drive pump output command module 70, an idle pump output command module 72, a cooling system output command module 74, an auxiliary pump output command module 76, and an air-conditioning system output command module 78. A negative flow control pump command output module (not shown) may also be provided. Each of output command modules 48 may be configured to generate a request for power generation system 22 to operate under an operating condition or set of operating conditions. The " . . . N" notation associated with air-conditioning system output command module 78 indicates that additional, fewer, or different output command modules may be included. In other words, the listing of output command modules 48 is exemplary, and it should be understood that the type and number of output command modules 48 may differ for different machines.

Output command modules 48 may obtain power distribution signals from power distribution module 46. The power distribution signals may be indicative of the amounts of power that power transforming devices 20 may receive from power generation system 22. The output command modules 48 may relay those amounts of power to their respective power transforming devices 20, or may otherwise trigger the delivery of power from power generation system 22 to power transforming devices 20. Power transforming devices 20 may not use more power than made available to output command modules 48 from power distribution module 46.

Output command modules 48 may be configured to store and access information describing one or more relationships between operation of power transforming devices and power generation system operation. For example, the information may describe an operating condition of power generation system 22 that may be suitable for supplying an amount of power to one of power transforming devices 20. It is contemplated that since each of power transforming devices 20 may receive different amounts of power depending on the distribution strategy implemented by power distribution module 46, the information may include suitable operating conditions for a plurality of different levels of power for each of power transforming devices 20. When output command modules 48 obtain power distribution signals from power distribution module 46, each of them may determine the operating condition of power generation system 22 that may be suitable for producing the amount of power prescribed by its power distribution signal. Each of output command modules 48 may generate an operating condition request, requesting that power generation system 22 operate under the determined operating condition. The suitable operating condition may be the one that helps with machine efficiency, machine response, reduction of emissions, cooling, aftertreatment processes, and/or noise-reduction.

Each of output command modules 48 may also assign a priority to its operating condition request. The priority may be indicative of the importance of the operating condition request. The importance may be determined based on criteria. For example, if a particular power transforming device, such as a braking system or transmission, needs power generation system 22 to operate under a specified operating condition immediately, the output command module associated with that power transforming device may assign a top level priority to the operating condition request to convey its importance. If the power transforming device needs power generation system 22 to operate under the specified operating condition to protect machine 10 from being damaged, or from experiencing excessive wear and tear, the output command module associated with that power transforming device may assign an intermediate level priority to the operating condition request, to convey that it is of intermediate importance, or lesser importance than a top level priority power request. If the power transforming device needs power generation system 22 to operate under the specified operating condition to maintain or improve machine operation, the power transforming device's output command module may assign a bottom level priority to the operating condition request, to convey that it is of relatively low importance, or lesser importance than an intermediate level priority power request. The higher the priority level, the higher the probability that the operating condition requested will be implemented.

The priority levels assigned by output command modules 48 may be assigned based on the functions of power transforming devices 20 associated with output command modules 48. For example, if an output command module is associated with a power transforming device that is part of a braking system of machine 10, that output command module may assign a top level priority to its operating condition requests. If, on the other hand, an output command module is associated with a power transforming device that is part of a hydraulic actuator, that output command module may always assign an intermediate level priority to its operating conditions requests. Similarly, if an output command module is associated with a power transforming device that is part of a cab cooling system, that output command module may assign a bottom level priority to its operating condition requests. Additionally or alternatively, power generation control module 50 may be programmed to associate a particular priority level with a particular power transforming device. It should be understood that a single power transforming device may have different priority levels in different machines and/or environments.

Power generation control module 50 may obtain operating condition requests from output command modules 48. Additionally or alternatively, power generation control module 50 may obtain priorities assigned to the operating condition requests from output command modules 48. Based on the operating condition requests and/or the assigned priorities, power generation control module 50 may selectively adjust the operating conditions of engine 26 and/or auxiliary power source 28. In order to do so, power generation control module 50 may generate an engine power generation control request and/or an auxiliary power generation control request for implementing operating conditions.

Power generation modules 52 may include an engine power generation module 80 associated with engine 26 and an auxiliary power generation module 82 associated with auxiliary power source 28. Engine power generation module 80 may obtain the engine power generation control request from power generation control module 50. Based on the engine power generation control request signal, engine power generation module 80 may generate an engine power generation signal. The engine power generation signal may instruct engine 26, and/or one or more devices responsible for controlling engine operation, to institute the operating condition or conditions prescribed by engine power generation control module 80. Similarly, auxiliary power generation module 82 may obtain an auxiliary power generation control request from power generation control module 50, and may generate an auxiliary power generation signal instructing auxiliary power source 28, and/or one or more devices responsible for its operation, to institute the operating condition or conditions prescribed by the auxiliary power generation control module 82. The " . . . N" notation associated with auxiliary power generation control module 82 indicates that additional, fewer, or different power generation control modules may be included depending on the type of machine.

An error recognition module 59 may communicate with engine available power module 54 and auxiliary available power module 56 via summation junction 57. Error recognition module 59 may take into account error values associated with engine 26, auxiliary power source 28, and/or power transforming devices 20. For example, when a signal is generated by these modules indicating that 200 kW of power is being requested or generated, the value may have error associated with it, such as, for example, plus or minus 20 kW. If the error is not accounted for, the available power and/or the power requests may be based on inaccurate or incorrect values, and thus, may themselves be inaccurate or incorrect. Error recognition module 59 may receive signals from output command modules 48 and power generation modules 52, and may modify the total combined power by introducing an error adjustment at a summation junction 58 to account for error.

Figure 5A:
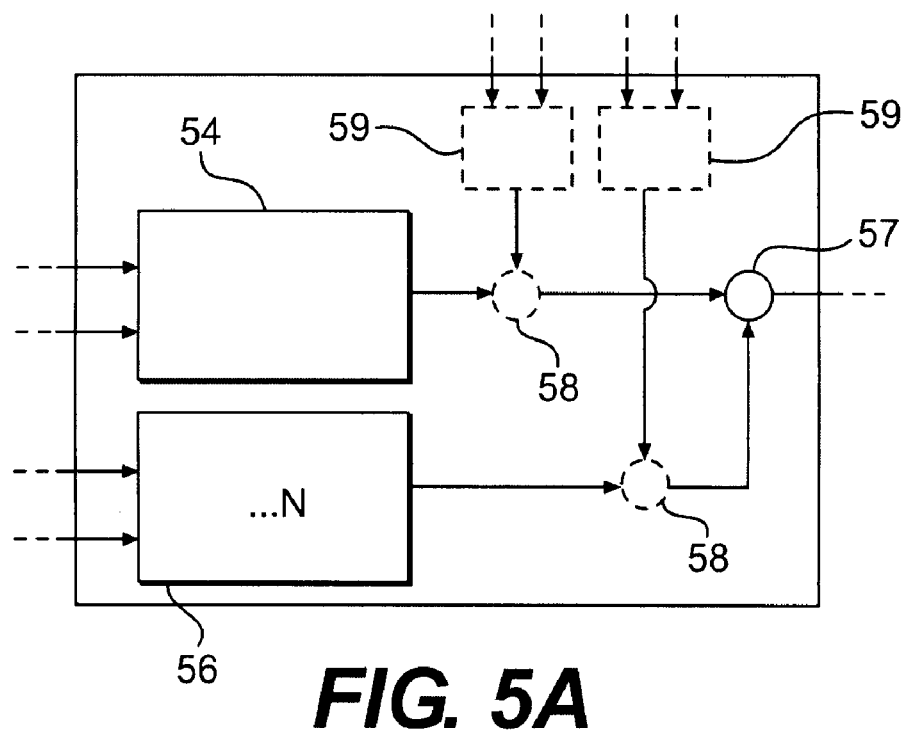
FIG. 5A is a schematic illustration of an alternative arrangement of a part of the exemplary control system of FIG. 2.
Figure 5B:
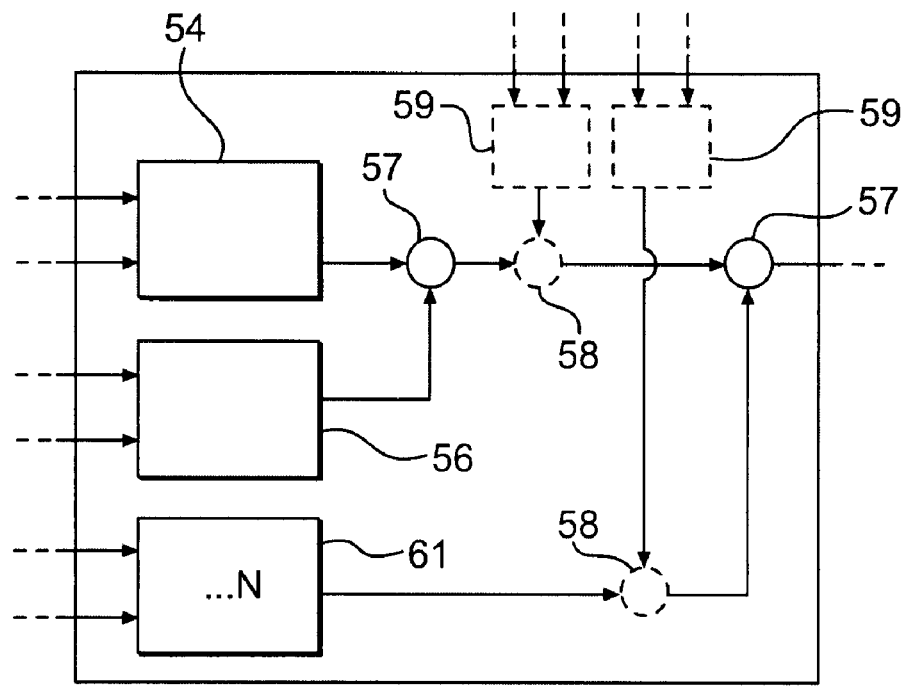
FIG. 5B is a schematic illustration of another alternative arrangement of a part of the exemplary control system of FIG. 2.

FIG. 5A shows an alternative error recognition module arrangement with at least one error recognition module 59 adjusting total available engine power and/or total available auxiliary power upstream from summation junction 57, so that a corrected total combined power for engine available power module 54 and auxiliary available power module 56 may be provided by summation junction 57. FIG. 5B shows yet another alternative error recognition module arrangement with at least one error recognition module 59 adjusting the total combined power from engine available power module 54 and auxiliary available power module 56, and/or the available power from another available power module 61, so that a corrected total combined power may be provided by summation junction 57. The " . . . N" notation in other available power module 61 indicates that additional, fewer, or different available power modules may be included depending on the type of machine. It should be understood that other error recognition module arrangements may also be used, and that error recognition module 59 may introduce error adjustments at any suitable point between engine available power module 54, auxiliary available power module 56, or any other available power module 61, and power distribution module 46. Further, it should also be understood that error recognition module 59 may account for devices included in power transforming devices 20 or power generation system 22, but without associated elements in modules 40, 42, and 48, or modules 52. For example, air-conditioning system 38 may be operatively coupled to engine 26, however, associated modules 68 and 78 may not exist. In this example, module 59 would account for the power being consumed by air conditioning system 38.

Figure 3:
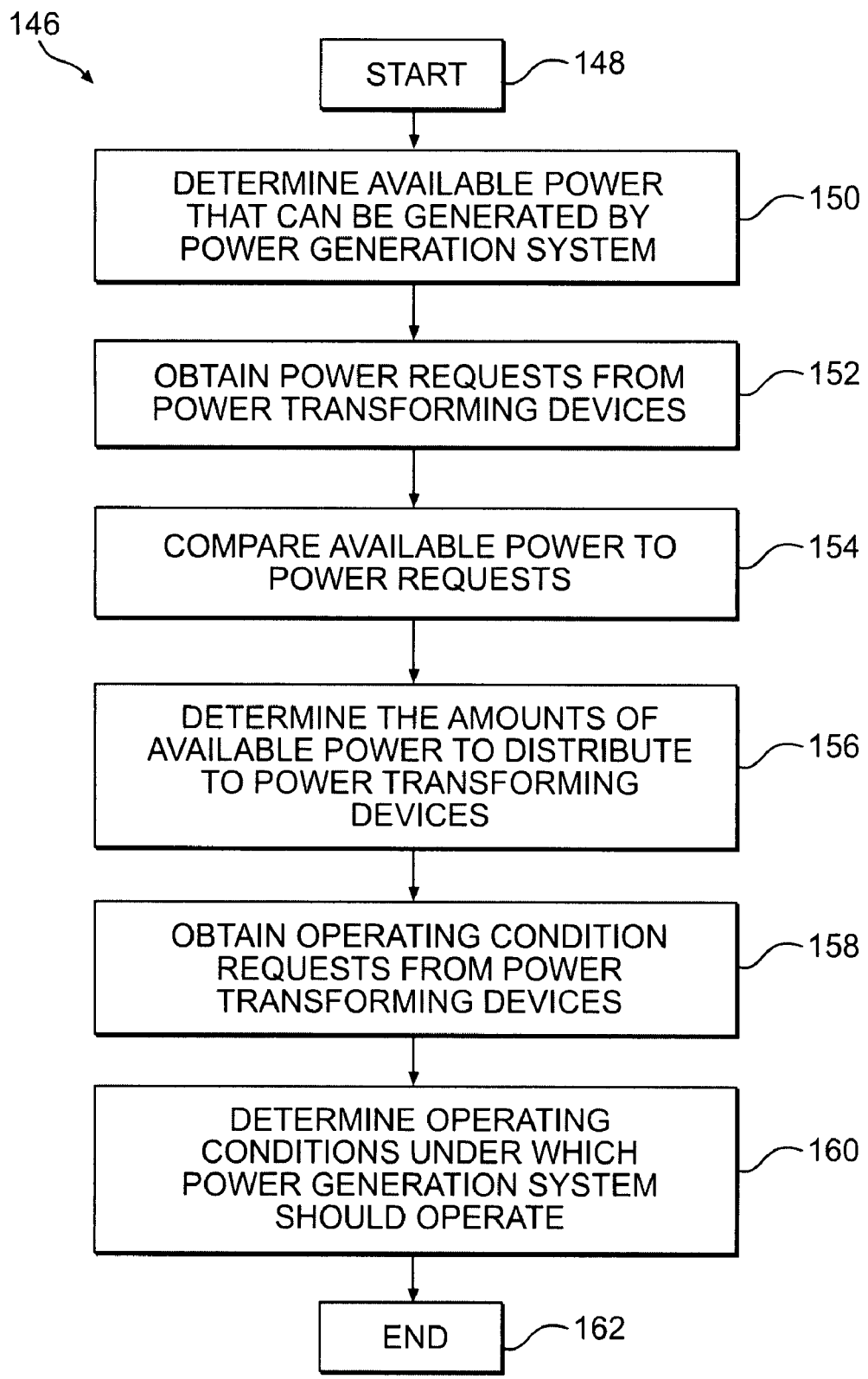
FIG. 3 is a flow diagram of a method according to one aspect of the present disclosure.

An exemplary method 146 for integrated power control in machine 10 will now be described with reference to FIG. 3. Method 146 may be implemented using elements of control system 24 described above.

Method 146 may begin (step 148) with the step of determining available power that can be generated by power generation system 22 (150). The next step may include obtaining power requests from power transforming devices 20 (step 152). Additionally or alternatively, engine speed or fluid flow requests may be obtained from power transforming devices 20. Communications may be carried out using power request modules 42 associated with power transforming devices 20. A comparison may be made between the available power and the power, speed, and/or flow requests (step 154). Based on the comparison, a determination may be made as to amounts of the available power that should be distributed to power transforming devices 20 (step 156). Operating condition requests may be obtained from output command modules 48 (step 158), and a determination may be made as to which operating conditions power generation system 22 should run under (step 160). Method 146 may then end (step 162).

Another exemplary method 84 for integrated power control in machine 10 will now be described with reference to FIG. 4A. Method 84 may be implemented using elements of control system 24 described above. Method 84 may begin (step 86) with processes carried out by available power modules 40. Engine available power module 54 may obtain engine related inputs (step 88) and use them to determine the total power that engine 26 can produce (step 90). Auxiliary available power module 56 may obtain auxiliary power source related inputs (step 92), and may use the auxiliary power source related inputs to determine the total power that auxiliary power source 28 can produce (step 94). The total engine power and the total auxiliary power may be summed at summation junction 57 to calculate the total combined power (step 99). Power distribution module 46 may obtain power requests from power request modules 42 (step 96) and power request priority levels assigned to the power requests (step 98), and may sum the power requests to calculate the total requested power (step 100).

Power distribution module 46 may obtain the total combined power and the total requested power, and may compare the two values to determine if the total combined power meets or exceeds the total requested power (step 102). If the total combined power meets or exceeds the total requested power (YES), power distribution module 46 may distribute, or trigger the distribution of, power to fulfill the requests of all power transforming devices 20 (step 104). Power distribution module 46 may carry out the distribution of power by generating power distribution signals that may be obtained by output command modules 48. The power distribution signals may indicate that there is enough total combined power to satisfy the requirements of all power transforming devices 20. Accordingly, power output command modules 48 may generate power output commands triggering the delivery of the requested amounts of power to power transforming devices 20.

If the total combined power does not meet the total requested power (NO), power distribution module 46 may intelligently distribute the total combined power among power transforming devices 20. In order to do so, power distribution module 46 may group the power requests according to their assigned priority levels (step 106). Power distribution module 46 may compare the total combined power to the sum of the power requests that have top level priority, to determine if the total combined power meets or exceeds the sum of top level priority power requests (step 108). If the total combined power meets or exceeds the sum of top level priority power requests (YES), power distribution module 46 may distribute, or trigger the distribution of, the total combined power to fulfill the requests of each of power transforming devices 20 that has a top level priority power request (step 110). If the total combined power does not meet the sum of the top level priority power requests (NO), power distribution module 46 may proportionally distribute, or trigger the proportional distribution of, the total combined power to each of power transforming devices 20 that has a top level priority power request (step 112).

For example, suppose that the total combined power equals 10 units of power. A first power transforming device, such as drive pump 30, may request 10 units of power using drive pump power request module 60. Drive pump 30 may require the requested power to immediately move machine 10 out of a path of travel, and as such, the request may be assigned a top level of priority. A second power transforming device, such as auxiliary pump 36, may request 90 units of power using auxiliary pump power request module 66. Auxiliary pump 36 may require the requested power for similar reasons, and as such, the request may also be assigned a top level of priority. Power distribution module 46 may determine that of all the top level priority power requests, the power requested by the first power transforming device, drive pump 30 in this hypothetical, makes up one-tenth of the total, while the power requested by the second power transforming device, auxiliary pump 36, makes up nine-tenths of the total. Thus, power distribution module 46 may distribute one-tenth of the total combined power (i.e., 1 unit of power) to drive pump 30, and nine-tenths of the total combined power (i.e., 9 units of power) to auxiliary pump 36. Since no available power remains, any intermediate level priority power requests and any bottom level priority power requests will not be fulfilled.

It should be understood that the portion of the total combined power distributed to each power transforming device, whose power request has been assigned the same priority level as the requests of other power transforming devices, may be determined by the following equation: $P_P = P_C \times (P_R/P_T)$. In the equation, $P_P$ may represent the portion of the total combined power that should be distributed to the power transforming device, $P_C$ may represent the total combined power, $P_R$ may represent the power requested by the power transforming device, and $P_T$ may represent the sum of power requested by all power transforming devices that have the same assigned priority level.

After fulfilling the top level priority power requests, power distribution module 46 may determine whether any of the total combined power remains, and whether the remaining total combined power meets or exceeds the sum of the intermediate priority level power requests (step 114). If the remaining total combined power meets or exceeds the sum of the intermediate level priority power requests (YES), power distribution module 46 may distribute, or trigger the distribution of, the remaining total combined power to fulfill the requests of each of power transforming devices 20 that has an intermediate level priority power request (step 116). If the remaining total combined power does not meet the sum of the intermediate level priority power requests (NO), power distribution module 46 may proportionally distribute, or trigger the proportional distribution of, the remaining total combined power to each of power transforming devices 20 that has an intermediate level priority power request proportionally (step 118).

After fulfilling the intermediate level priority power requests, power distribution module 46 may proportionally distribute, or trigger the proportional distribution of, any remaining total combined power to fulfill the requests of power transforming devices 20 that have bottom level priority power requests (step 120). Additionally or alternatively, power distribution module 46 may be programmed to automatically separate power requests into groups based on the type of power transforming devices they came from.

As shown in FIG. 4B, power output command modules 48 may obtain power distribution signals from power distribution module 46, and based on the power distribution signals, power output command modules 48 may identify operating conditions for engine 26 and/or auxiliary power source 28 that may be suitable for producing the distributed amounts of power. Accordingly, power output command modules 48 may generate operating condition requests and/or priority levels. Power generation control module 50 may obtain the operating condition requests (step 122) and/or priority levels (step 124) from power output command modules 48. Output command modules 48 may set forth operating conditions for engine 26 and auxiliary power source 28 that may help with efficiency, emissions, cooling, aftertreatment, and/or noise reduction. Power generation control module 50 may group the operating condition requests according to their priority levels (step 126).

Power generation control module 50 may select the operating conditions for engine 26 and/or auxiliary power source 28 by, for example, choosing those that may fulfill the greatest number of top priority level operating condition requests. It is also contemplated that power generation control module 50 may calculate an average operating condition as a compromise between multiple top priority level operating condition requests. Power generation control module 50 may implement the selected operating conditions by generating power generation control requests describing the selected operating conditions (step 128).

Power generation control module 50 may also select the operating conditions for engine 26 and/or auxiliary power source 28 by choosing those that fulfill the greatest number of intermediate priority level operating condition requests without violating or conflicting with any of the top priority level operating condition requests. Intermediate priority level operating condition requests may also be averaged. Power generation control module 50 may implement the selected operating conditions by generating power generation control request signals describing them (step 130).

Power generation control module 50 may also select the operating conditions for engine 26 and/or auxiliary power source 28 by choosing those that fulfill the greatest number of bottom priority level operating condition requests without violating any of the top or intermediate priority level operating condition requests. Additionally or alternatively, averaging of bottom priority level operating condition requests may be used. Power generation control module 50 may implement the selected operating conditions by generating power generation control requests describing them (step 132). Additionally or alternatively, power generation control module 50 may not consider priority levels, and may be programmed to group operating condition requests based on the type of power transforming devices they came from.

Engine power generation module 80 and auxiliary power generation module 82 may obtain the power generation control requests (step 134). Engine power generation module 80 may generate an engine power generation command based on the engine power generation control requests (step 136). The engine power generation command may instruct engine 26 to operate in accordance with the operating conditions identified in steps 128-132. The engine power generation command may be sent to engine 26 (step 138). Auxiliary power generation module 82 may generate an auxiliary power generation command based on the auxiliary power generation control requests (step 140). The auxiliary power generation command may instruct auxiliary power source 28 to operate in accordance with the operating conditions identified in steps 128-132. The auxiliary power generation command may be sent to auxiliary power source 28 (step 142). After commands are sent to engine 26 and auxiliary power source 28, method 84 may end (step 144).

Engine available power module 54 may obtain the engine power generation command signal from engine power generation module 80, and may use the command as an input for determining the power available from engine 26 for the next iteration of method 84. Similarly, auxiliary available power module 56 may obtain the auxiliary power generation command from auxiliary power generation module 82, and may use the command as an input for determining the power available from auxiliary power source 28 for the next iteration of method 84.

INDUSTRIAL APPLICABILITY

The disclosed control system 24 may have applicability in assemblies having multiple power transforming devices relying on a common source of power. Control system 24 may have particular applicability in intelligently distributing power from a power generation system 22 to power transforming devices 20 in a machine.

Control system 24 may intelligently distribute the power to power transforming devices 20 in a manner that helps to ensure that power requests of higher importance are more likely to be fulfilled than power requests of lower importance. This may help to ensure that power is used efficiently and effectively, and that power may be available to power transforming devices when necessary. Intelligent distribution may also reduce the occurrence of engine stalls by helping to ensure that the power transforming devices 20 do not attempt to draw more power than is available.

Control system 24 may also intelligently determine the operating conditions under which to run power generation system 22. By doing so, control system may ensure that the power will be generated in a suitable manner. For example, control system 24 may help to ensure that power generation system 22 may operate in an efficient state, or one that is beneficial in terms of emissions, cooling, aftertreatment, and/ or noise reduction. Additionally, control system 24 may operate continuously as machine 10 moves in or between job sites or from one operation to another, allowing control system 24 to intelligently distribute power and set operating conditions even under transient conditions.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A machine, comprising:
a power generation system operatively coupled to a power generation module;
power transforming devices configured to receive power from the power generation system, wherein the power transforming devices are operatively coupled to power request modules and output command modules; and
a control system operatively coupled to the power generation module, the power request modules, and the output command modules, wherein the control system includes:
at least one available power module configured to determine how much power can be generated by the power generation system;
a power distribution module configured to obtain inputs from the available power modules and the power request modules, to determine amounts of power that can be distributed to the power transforming devices; and
a power generation control module configured to obtain inputs from the power distribution modules and the output command modules, to determine the operating condition under which the power generation system should operate.

2. The machine of claim 1, wherein the inputs from the available power modules and the power request modules are indicative of available power that the power generation system can generate, power requests from the power transforming devices, and the importance of the power requests.

3. The machine of claim 1, wherein the inputs from the power distribution module and the output command modules are indicative of power distributed to the power transforming devices, operating conditions for the power generation system that are suitable for generating the distributed power, and the importance of the operating conditions.

4. A method for distributing power generated by a power generation system, comprising:
determining available power that can be generated by the power generation system;
obtaining power requests from power transforming devices;
comparing the available power to the power requests;
determining amounts of the available power to distribute to the power transforming devices;
obtaining operating condition requests from the power transforming devices; and
determining the operating conditions under which the power generation system should operate;
wherein determining amounts of the available power to distribute further includes assigning one of a top level priority, an intermediate level priority, and a bottom level priority to each of the power requests and comparing the available power to at least one of a sum of top level priority power requests, a sum of intermediate level priority power requests, and a sum of bottom level priority power requests.

5. The method of claim 4, wherein determining amounts of the available power to distribute further includes comparing the available power to the sum of intermediate level priority power requests only if the top level priority power requests have been fulfilled.

6. The method of claim 5, wherein determining amounts of the available power to distribute further includes comparing the available power to the sum of bottom level priority power requests only if the top level priority power requests and the intermediate level priority power requests have been fulfilled.

7. A control system, comprising:
a platform;
a display device; and
a processor in communication with the platform and the display device, wherein the processor is configured to:
determine available power that can be generated by a power generation system;
obtain power requests;

determine amounts of available power that can be used to fulfill the power requests based on magnitudes of the power requests;

obtain operating condition requests requesting for the power generation system to operate under one or more operating conditions; and select at least one of the operating condition requests for use as a basis for controlling the operation of the power generation system.

8. The control system of claim 7, wherein power request priority values are assigned to the power requests.

9. The control system of claim 8, wherein top level priority values are assigned to a first group of power requests.

10. The control system of claim 8, wherein intermediate level priority values are assigned to a second group of power requests related to machine preservation.

11. The control system of claim 8, wherein bottom level priority values are assigned to a third group of power requests related to maintenance or improving machine efficiency.

12. The control system of claim 7, wherein operating condition priority values are assigned to the operating condition requests.

13. The control system of claim 12, wherein top level priority values are assigned to a first group of operating condition requests.

14. The control system of claim 12, wherein intermediate level priority values are assigned to a second group of operating condition requests related to machine preservation.

15. The control system of claim 12, wherein bottom level priority values are assigned to a third group of operating condition requests related to improving machine efficiency.

* * * * *